United States Patent [19]

Silberhorn

[11] Patent Number: 5,543,669
[45] Date of Patent: Aug. 6, 1996

[54] REMOTE FEED CIRCUIT IN COMMUNICATION SYSTEMS

[75] Inventor: Gottfried Silberhorn, Munich, Germany

[73] Assignee: Siemens Aktiengesellschaft, Munich, Germany

[21] Appl. No.: 354,606

[22] Filed: Dec. 13, 1994

[30] Foreign Application Priority Data

Dec. 13, 1993 [DE] Germany ............ 43 42 480.5

[51] Int. Cl.⁶ .................................................. H01H 83/20
[52] U.S. Cl. ............... 307/125; 307/38; 307/139; 340/664; 340/825.06; 361/72; 361/119
[58] Field of Search ............... 307/125, 38, 139; 361/119, 72; 340/825.06, 664, 532; 379/412, 2

[56] References Cited

U.S. PATENT DOCUMENTS

| | | | |
|---|---|---|---|
| 4,206,443 | 6/1980 | Britton | 340/825.06 |
| 4,264,787 | 4/1981 | Yachabach et al. | 179/81 |
| 4,983,955 | 1/1991 | Ham Jr. et al. | 340/664 |
| 5,392,349 | 2/1995 | Elder | 379/412 |

FOREIGN PATENT DOCUMENTS

| | | |
|---|---|---|
| 0185213 | 6/1986 | European Pat. Off. . |
| 3920805 | 1/1991 | Germany . |
| 4039990 | 6/1992 | Germany . |

OTHER PUBLICATIONS

Natzadapter Elector, Oct., 1983, pp. 10–27 to 10–29.
Electronik 15/25.7 pp. 99–102 Integreirte Strommessung und Uberlastxchutz.

*Primary Examiner*—William M. Shoop, Jr.
*Assistant Examiner*—Albert W. Paladini
*Attorney, Agent, or Firm*—Hill, Steadman & Simpson

[57] ABSTRACT

In communication systems, a dc voltage source can be connected via a first and a second winding of an input transformer and a subscriber line to every communication terminal equipment device by using an electronic switch. In case of an overload, the turn-off duration, i.e. the time until the disconnect of the dc voltage source is influenced dependent on a load-generated loop current by using an integrating element and a comparator. As a result thereof, short turn-off durations and, consequently, significantly reduced thermal loads on the electronic switch occur given substantial overloads. The present invention allows the use of electronic switches having a lower maximum load.

13 Claims, 1 Drawing Sheet

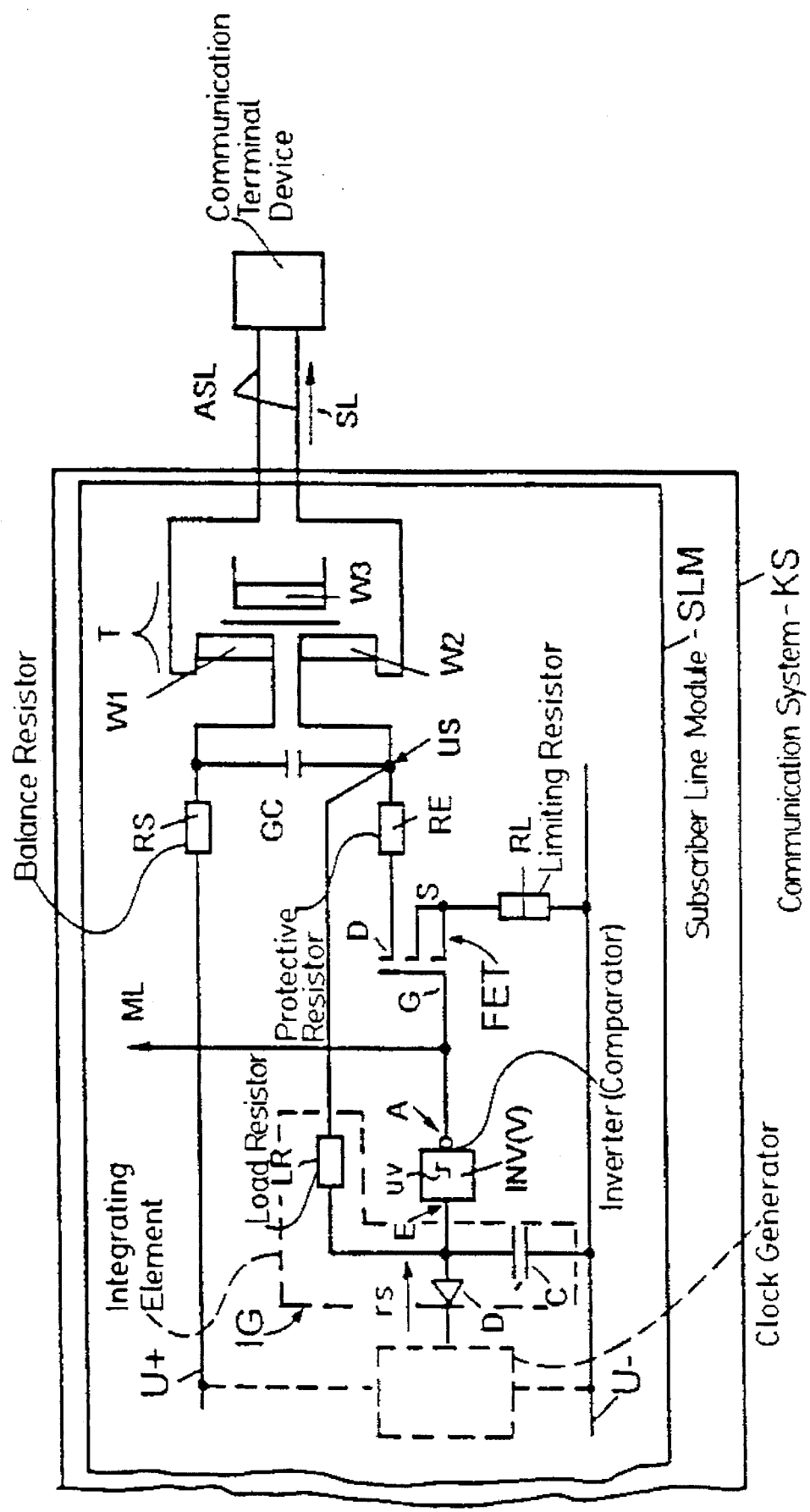

REMOTE FEED CIRCUIT IN COMMUNICATION SYSTEMS

BACKGROUND OF THE INVENTION

1. Field of the Invention

The invention is directed generally to a feed circuit in communication systems. More specifically, the circuit is for the remote feed of connected communications terminal devices. A dc voltage source is connectable to a subscriber line or disconnectable from the subscriber line by using an electronic switch via windings of an input transformer connected to the subscriber line. The switching input of the electronic switch is connected to one hole of the dc voltage source, and the switch output thereof is connected to a winding of the transformer. The dc voltage source is switchable via the control input thereof.

2. Description of the Related Art

Such a feed circuit is disclosed in a publication of Siemens AG, "IC's for Communications", 1989, pp. 244–257. The feed circuit indicated in FIG. 1 therein has an integrated circuit PEB 2025 "ISDN exchange power controller (IEPC)". An electronic switch is provided in this integrated circuit for every subscriber line, and the switching input of this electronic switch is connected to a pole of the dc voltage source and the switch output thereof is connected to a winding of the input repeater connected to the subscriber line. The dc voltage source is connectable via the control input thereof with a control logic.

In case of an overload, for example, given a short on the subscriber line, the overload procedure described on page 249 of the above-referenced publication sequences. In this overload procedure, high dissipated power occur, particularly in the first 200 ms. The electronic switch is capably-sized such that the high dissipated powers do not lead to the destruction of the switch. This means that given a short, the dissipated power defines the size of the electronic switch. Consequently, high-cost electronic switches, which have properties that lie far beyond the properties necessary during normal operation, are required.

SUMMARY OF THE INVENTION

It is an object of the present invention to provide an improved feed circuit in communication systems which disconnects a voltage source from a subscriber line to protect the electronic switch during an overload.

In an embodiment of the feed circuit of the invention, means for generating a proportional voltage from a loop current is connected to an integrating element connected to a comparator. The output of the comparator is connected to the control input of an electronic switch and controls the latter such that the electrical dc voltage source is disconnected from the subscriber line when the integrated voltage appearing at the switch output exceeds a prescribed comparison voltage value. The dc voltage source is advantageously disconnected more rapidly or more slowly from the subscriber line dependent on the magnitude of the overload of the feed circuit by inserting an integrating element and a comparator. Thus, an extremely short delay time before the disconnection of the dc voltage source is achieved using the integrating element when extremely high overload currents, for example, those caused by shorts, occur.

In addition, the integration constant of the integrating element is to be dimensioned such that the constant voltage source is not disconnected from the subscriber line when short, allowed overloads such as, for example, when connecting a communication terminal equipment device to the subscriber line occur. As a result of the automatic setting of different delay times by the integrating element, the time of the maximum load of the electronic switch can be substantially shortened. By shortening the time of the maximum overload of the electronic switch, less expensive electronic switches can be used. This leads to substantial cost savings in the communication systems, since electronic switches are provided for every subscriber line or communication terminal equipment.

Preferably, the electronic switch is a MOS power field effect transistor (FET). Alternatively, bipolar transistors can be used. In an advantageous embodiment of the feed circuit of the invention, a source terminal of the MOS power field effect transistor is connected to a negative pole of the dc voltage source via a limiting resistor, and a drain terminal is connected to a winding of the input transformer via a protective resistor. The maximum allowable loop current, i.e., a current limitation given a short, is set using the limiting resistor, and lightning protection required for subscriber line circuits uses the protective resistor together with two protective diodes. A first end of a load resistor is additionally connected to the winding. The load resistor is part of a series circuit of load resistor and a capacitor.

This series circuit represents an especially advantageous embodiment of the integrating element, wherein a first end of the capacitor is connected to the negative pole of the dc voltage source and the interconnected terminals of the load resistor and the capacitor are connected to an input of the comparator.

The comparator is advantageously embodied with an inverter element in a standardized, integrated circuit technology, whereby the input and output thereof represent the input and output of the comparator. Preferably, an inverting element of CMOS circuit technology exhibiting low power consumption is used. When an input voltage of, for example, 5 volts (given an operating voltage of 10 volts) is exceeded, the output of the inverter element is driven into an inverting condition. The switching threshold is thereby established by the internally-prescribed comparison voltage value of 5 volts.

In an embodiment having the integrating element together with a comparator in an integrated circuit, a plurality of comparators are interconnected at the input thereof and the other input of the comparators is connected to a respective resistor of a chain of resistors connected to a reference voltage. The outputs of the comparators drive a counter such that the exceeding of the prescribed voltage is differently delayed at the control input of the electronic switch dependent on the magnitude of the voltage proportional to the loop current occurring at the protective resistor over a predetermined value. As a result, the dc voltage is disconnected from the subscriber line.

Alternatively, an integrating element can be formed by a comparator. Various comparison voltages or, respectively, a reference voltage can be connected to further inputs of the comparator. The recited embodiments of an integrating element with comparators or, respectively, counters are directed to an embodiment in integrated circuits, since capacitors, in particular, can only be realized in integrated circuits with substantial outlay. Given such an embodiment, the different delay times formed with the assistance of the counters are to be matched to the properties of the electronic switch.

Given the feed circuit of the invention, the dc voltage source is not automatically reconnected to the subscriber line, for example after a predetermined time, after the dc voltage source has been disconnected from the subscriber line. This is an intentional measure so that the recuperation time of the electronic switch is sure to be observed.

One possibility of reconnecting the voltage source to the subscriber line involves connecting a pulse means to the integrating element such that the integrating element is influenced by at least one reset pulse formed in the pulse means such that the voltage source is reconnected to the subscriber line. A pulse is generated that discharges the capacitor, as a result whereof a change in potential is effected at the output of the comparator. This change in potential influences the electronic switch such that the voltage source is connected to the winding of the input transformer.

A further version of the reconnection of the voltage source involves reporting the disconnection of the voltage source to a higher ranking control, for example, via a potential line. The reconnection of the voltage source is effected with the assistance of this higher-ranking control, for example by applying a reset pulse to the integrating element. The period duration or, respectively, the reconnection time of the reset signals that are formed is to be defined for both the pulse means as well as with a central control, for example, a microprocessor, so that the recuperation time of the electronic switch means is observed.

According to a further advantageous embodiment of the feed circuit of the invention, the size of the limiting resistor and of the protective resistor is to be matched to the integration speed of the integrating element, and the comparator comparison voltage is to be matched to the properties with respect to the load of the electronic switch and to an allowed, brief-duration overload. The properties with respect to the load of the electronic switch are defined by the type of MOS power FET that has been selected. The predetermined, allowed overload time is defined by the time at which an overload of the feed circuit arises due to the connection of a communication terminal equipment to the subscriber line. The allowed overload, given connection of the communication terminal equipment devices, is caused by the charging of the capacitors.

Preferred embodiments of the feed circuit of the present invention shall be set forth in greater detail below with reference to a circuit diagram.

BRIEF DESCRIPTION OF THE DRAWINGS

The sole FIGURE illustrates an embodiment of a feed circuit of the present invention.

DETAILED DESCRIPTION OF THE PREFERRED EMBODIMENTS

The FIGURE partially shows a subscriber line module SLM of a communication system KS. A communication terminal equipment device is shown as a representative example of a plurality of communication terminal equipment devices connected to the communication system KS via a two-lead subscriber line ASL. One lead of the two-lead subscriber line ASL is connected to a first end of a first winding W1 of an input transformer T in the subscriber line module SLM and the second lead is connected to a first end of a second winding W2. A third winding W3 of the input transformer T is part of equipment (not shown) on the subscriber line module SLM that is not critical to the invention. A second end of the first winding W1 is connected to a balance resistor RS and a second end of the second winding W2 is connected to a first end of a protective resistor RE. A smoothing capacitor GC is connected between the two ends of the first and second windings W1, W2. The balance resistor RS is connected to a positive pole of a dc voltage source U. A second end of the protective resistor RE is connected to a drain terminal D of a MOS low-power FET. A source terminal S thereof is connected via a limiting resistor RL to a negative pole of the dc voltage source U. A gate terminal G of the MOS low-power FET is connected to an output A of an inverter INV. The inverter INV represents a comparator V of the invention that is advantageously embodied by an integrated circuit of a CMOS series, for example 4049. Also, for example, a BSP 123 of Siemens AG is provided as the MOS low-power FET.

The input of the inverter INV is connected to both a first end of a capacitor C and to a first end of a load resistor LR. A second end of the load resistor LR is connected to a connection point of the second winding W2 and the protective resistor RE. A second end of the capacitor C is connected to the negative pole of the dc voltage source U. The series circuit of the load resistor LR and of the capacitor C forms an integrating element IG of the invention. The IG is indicated with broken lines in the FIGURE.

A reset signal rs is supplied to an input E of the inverter INV via a de, coupling diode D. This reset signal rs is formed either in a clock generator provided for this purpose—indicated with broken lines—or is formed in a further means (not shown), for example a microprocessor. The reset signal rs must have a pulse duration within which the capacitor C is completely discharged. Further, the time span between two reset pulses must be at least above the recuperation time of the MOS low-power FET after an overload.

When an activated communication terminal equipment device is connected, a loop current SL flows across the limiting resistor RL, across the MOS low-power FET, across the protective resistor RE, the second winding W2, across the subscriber line ASL to the communication terminal equipment, back to the first winding W1 and via the balancing resistor RS to the positive pole of the dc voltage source U.

A voltage us proportional to the loop current SL is thereby established at the connection point of the protective resistor RE and the second winding W2 and at the capacitor C via the load resistor LR. During "normal" or intended operation, the voltage us does not exceed an internal threshold voltage uv of the inverter INV. An output A of the inverter INV has a potential at which the MOS low-power FET is driven into a conductive condition, i.e. into a transmissive condition.

When, for example, the loop current SL rises rapidly as a consequence of a short circuit, then the voltage us at the protective resistor RE rises immediately. As a result, a rapid charging of the capacitor C is effected via the load resistor LR. After exceeding the threshold voltage uv set in the inverter INV, the output A of the inverter INV is applied to a potential at which the MOS low-power FET is driven into the inhibited condition. As a result, a fast disconnect of the constant voltage source U from the subscriber line ASL or, respectively, from the communication terminal equipment device is achieved.

Due to the fast disconnect, the MOS low-power FET is loaded substantially less than when a permanently prescribed turn-off duration occurs, for example, 200 ms given the integrated circuit initially recited. The rapidity of the disconnect is determined by the integration time constant of the integrating element IG, as well as by the threshold voltage uv and the values of the respective limiting and protective resistors RL, RE. This means that these circuit components are to be matched to one another such that the MOS low-power FET is not thermally destroyed in case of overload. In addition, the circuit components are to be dimensioned such that the dc voltage source U is not disconnected from the subscriber line ASL upon activation of a communication terminal equipment device which causes a brief-duration increase in the loop current.

The inhibited condition of the MOS low-power FET continues to exist until a reset pulse rs is forwarded to the input E of the inverter INV. The capacitor C is discharged as a result thereof and a potential at which the MOS low-power FET is switched back into the conductive condition is forwarded to the output A of the inverter INV. A message line ML is advantageously connected from the output A of the inverter INV to further equipment (not shown), for example a microprocessor. The disconnect of the dc voltage source U from the subscriber line ASL is reported to the further equipment over the message line ML. A reset signal rs can be formed in response thereto in the further equipment, for example a microprocessor, and can be forwarded to the input E of the inverter INV.

Although other modifications and changes may be suggested by those skilled in the art, it is the intention of the inventor to embody within the patent warranted hereon all changes and modifications as reasonably and properly come within the scope of his contribution to the art.

I claim:

1. In a feed circuit in communication systems for the remote feed of communication terminal equipment connected as a load, wherein a dc voltage source can be connected to or disconnected from a subscriber line via a first winding and a second winding of an input transformer connected to the subscriber line by using an electronic switch, said switch having a switch input connected to a negative pole of said dc voltage source and having a switch output connected to said second winding so that said dc voltage source is switchable via a control input thereof, the improvement comprising:

means for generating a proportional voltage from a load-generated loop current, said means for generating connected to the switch;

means for integrating said generated proportional voltage connected to said means for generating, said integrating means having a pre-selected integration time constant; and a comparator having a prescribed voltage comparison value connected to said means for integrating, said comparator having an output connected to said control input of said electronic switch to control said electronic switch to disconnect said dc voltage source from said subscriber line within said pre-selected integration time constant when said integrated proportional voltage exceeds said prescribed voltage comparison value thereby preventing thermal destruction of said electronic switch.

2. Feed circuit according to claim 1, wherein said electronic switch further comprises:

a MOS power field effect transistor (FET) having a gate, a source and a drain terminal, wherein said control input of said electronic switch is said gate terminal of said MOS FET, said switch output is said drain terminal of said MOS FET and said switch input is said source terminal of said MOS FET.

3. Feed circuit according to claim 2, wherein said source terminal of said MOS FET is connected via a limiting resistor to the negative pole of said dc voltage source, and said drain terminal is connected via a protective resistor to said second winding of said input transformer.

4. Feed circuit according to claim 3, wherein said comparator further comprises:

an inverter element of standardized, integrated circuit technology (CMOS), having an input and an output, wherein said input and said output of said inverter element are said input and said output of said comparator, respectively.

5. Feed circuit according to claim 4, wherein said integrating element is a series circuit of a load resistor having a first end and a second end and a capacitor having a first end and a second end, wherein said first end of said load resistor is connected to a connection point of said second winding and said protective resistor, said first end of said capacitor is connected to said negative pole of said dc voltage source, and said second end of both said load resistor and said capacitor are connected to said input of said comparator.

6. Feed circuit according to claim 1, wherein said integrating element further comprises:

a reference voltage source;

a plurality of resistors connected to said reference voltage source;

a counter; and a plurality of comparators each having a first and a second input, said plurality of comparators forming an integrated circuit wherein said first input of each of said plurality of comparators is interconnected and said second input is connected to a respective resistor of said plurality of resistors, said plurality of comparators having outputs that drive said counter such that when the outputs exceed said reference voltage, said output is delayed to said control input of said electronic switch dependent on the value of said integrated proportional voltage above said prescribed voltage comparison value to effect a disconnection of said dc voltage source from said subscriber line.

7. Feed circuit according to claim 1, further comprising:

pulse means for generating at least one reset signal, said pulse means being connected to said integrating element to enable said integrating element to reconnect said dc voltage source to said subscriber line as a result of providing said at least one reset signal generated in said pulse means to said integrating element.

8. Feed circuit according to claim 7, wherein said pulse means further comprises:

a clock generator to generate said reset signals having a period duration that exceeds a recuperation time of said electronic switch.

9. Feed circuit according to claim 1, wherein resistance values for said limiting resistor and said protective resistor, integration speed of said integrating element, and said comparator comparison voltage are matched to loading properties of said electronic switch.

10. In a feed circuit in communication systems for the remote feed of communication terminal equipment connected as a load, wherein a dc voltage source can be connected to or disconnected from a subscriber line via a first winding and a second winding of an input transformer connected to the subscriber line by using an electronic switch, said switch having a switch input connected to a negative pole of said dc voltage source and having a switch output connected to said second winding so that said dc voltage source is switchable via a control input thereof, the improvement comprising:

means for generating a proportional voltage from a load-generated loop current, said means for generating connected to the switch;

means for integrating said generated proportional voltage connected to said means for generating, said integrating means having a pre-selected integration time constant; and a comparator having a prescribed voltage comparison value connected to said means for integrating, said comparator having an output connected to said control input of said electronic switch to control said electronic switch to disconnect said dc voltage source from said subscriber line within said pre-selected integration time constant when said integrated proportional voltage exceeds said prescribed voltage comparison value thereby preventing thermal destruction of said electronic switch; and wherein the electronic switch comprises a MOS power field effect transistor (FET) having a gate, a source and a drain terminal, wherein said control input of said electronic switch is said gate terminal of said MOS FET, said switch output is said drain terminal of said MOS FET and said switch input is said source terminal of said MOS FET.

11. Feed circuit according to claim 10, wherein said source terminal of said MOS FET is connected via a limiting resistor to the negative pole of said dc voltage source, and said drain terminal is connected via a protective resistor to said second winding of said input transformer.

12. Feed circuit according to claim 11, wherein said comparator further comprises:

an inverter element of standardized, integrated circuit technology (CMOS), having an input and an output, wherein said input and said output of said inverter element are said input and said output of said comparator, respectively.

13. Feed circuit according to claim 12, wherein said integrating element is a series circuit of a load resistor having a first end and a second end and a capacitor having a first end and a second end, wherein said first end of said load resistor is connected to a connection point of said second winding and said protective resistor, said first end of said capacitor is connected to said negative pole of said dc voltage source, and said second end of both said load resistor and said capacitor are connected to said input of said comparator.

* * * * *